United States Patent [19]
Utsumi et al.

[11] 3,810,254
[45] May 7, 1974

[54] THERMOSTATIC SYSTEM FOR NUCLEAR GYROMAGNETIC RESONANCE SPECTROSCOPIC PERMANENT MAGNET APPARATUS

[75] Inventors: Yoshiharu Utsumi; Hideaki Terui, both of Katsuta, Japan

[73] Assignee: Hitachi-Ltd., Tokyo, Japan

[22] Filed: July 7, 1972

[21] Appl. No.: 269,738

[30] Foreign Application Priority Data
July 10, 1971   Japan.............................. 46-51303

[52] U.S. Cl.............. 324/0.5 R, 219/209, 335/301, 335/304
[51] Int. Cl. ...................................... G01n 27/78
[58] Field of Search........ 324/0.5 A, 0.5 R, 0.5 AH, 324/0.5 MA; 335/301, 302, 304, 306, 217; 219/209, 210

[56] References Cited
UNITED STATES PATENTS 3,474,222  10/1969  Gang................................ 324/0.5
3,007,023  10/1961  Johnston........................... 219/210
3,512,078  5/1970   Hall ................................. 324/0.5

Primary Examiner—Michael J. Lynch
Attorney, Agent, or Firm—Craig and Antonelli

[57]                ABSTRACT

A thermostatic system for nuclear gyromagnetic resonance spectroscopic permanent magnet apparatus comprising a thermostatic oven structure consisting of a first and second thermostatic ovens enclosing a permanent magnet is disclosed. The temperature of the first thermostatic oven is controlled and maintained at a predetermined temperature higher than ambient temperature. The second thermostatic oven is disposed between the permanent magnet and the first thermostatic oven, and its temperature is controlled and maintained at a predetermined temperature higher than the temperature of the first thermostatic oven. In this manner, the permanent magnet is held at a temperature substantially equal to the temperature of the second thermostatic oven.

27 Claims, 5 Drawing Figures

THERMOSTATIC SYSTEM FOR NUCLEAR GYROMAGNETIC RESONANCE SPECTROSCOPIC PERMANENT MAGNET APPARATUS

This invention relates to thermostatic systems employed with permanent magnet apparatus for nuclear gyromagnetic resonance spectroscopy.

Apparatus for nuclear gyromagnetic reasonance spectroscopy, particularly for high resolution nuclear gyromagnetic resonance spectroscopy such as analysis of the structure of organic compounds, use electromagnets and permanent magnets as d-c field generating means for orientating the nucleus spin of the sample.

In such apparatus, the magnet of whatever type is required to be maintained at a constant temperature for steadily maintaining the parallel degree of the magnet pole pieces to ensure steady resolution which depends upon the field uniformity.

Maintaining the magnet at a constant temperature is very important, since there is a temperature coefficient for the magnetomotive force of the magnet. For example, with a permanent magnet consisting of anisotrophic alnico cast magnets the temperature coefficient for the magnetomotive force is about $-2 \times 10^{-4}$ per degree Centigrade. Therefore, it is necessary to hold the whole permanent magnet apparatus at a constant temperature for obtaining steady field intensity and hence high resolution. The field intensity in the gap between the pole pieces is also subject to fluctuations due to external disturbing fields or when the leakage flux from the magnet apparatus links with an iron body moving in the neighbourhood of the apparatus. In order to prevent this field intensity fluctuation, there have heretofore been employed field control systems utilizing nuclear resonance signal.

In one prior-art system for regulating the temperature of permanent magnet apparatus a single, temperature regulatable thermostatic oven, which encloses the magnet apparatus, is maintained at a predetermined temperature higher than ambient room temperature, while air (hot air) within the thermostatic oven is circulated through a fan for heat exchange between the magnet apparatus and the thermostatic oven so as to maintain the magnet apparatus substantially at the same temperature as the thermostatic oven.

The above temperature regulating system may be conveniently employed for stabilizing the temperature of comparatively large-size nuclear gyromagnetic resonance permanent magnet apparatus installed in a room provided with air conditioning equipment. However, this system is not suited where the external temperature (room temperature) varies widely, since there are limitations on the ambient temperature range within which the stabilization of the magnet apparatus temperature is possible.

Also, the above system includes moving parts such as fan and motor which are required to be periodically replaced. Further, a comparatively long warming-up time is required from the closing of a power switch until the temperature of the apparatus is stabilized.

An object of the invention is to provide a thermostatic system for nuclear gyromagnetic resonance permanent magnet apparatus, which is less susceptible to external temperature fluctuations.

Another object of the invention is to provide a thermostatic system for nuclear gyromagnetic resonance permanent magnet apparatus, which has a high temperature stabilization factor.

A further object of the invention is to provide a thermostatic system for nuclear gyromagnetic resonance permanent magnet apparatus, in which no cooling means is required at all for maintaining the permanent magnet at a constant temperature.

A still further object of the invention is to provide a thermostatic system for nuclear gyromagnetic resonance permanent magnet apparatus, which permits controlling the permanent magnet apparatus temperature with high precision.

A yet further object of the invention is to provide a thermostatic system for nuclear gyromagnetic resonance permanent magnet apparatus, with which uniform temperature distribution over the whole permanent magnet apparatus is ensured.

Another object of the invention is to provide a thermostatic system for nuclear gyromagnetic resonance permanent magnet apparatus, in which in the detection of the permanent magnet apparatus temperature for temperature regulation thereof it is not necessary to obtain an average temperature by cancelling out temperatures at various parts of the magnet but it is only necessary to detect the temperature of a portion of the magnet.

Another object of the invention is to provide a thermostatic system for nuclear gyromagnetic resonance permanent magnet apparatus, which can also provide magnetic shield effect.

Yet another object of the invention is to provide a thermostatic system for nuclear gyromagnetic resonance permanent magnet apparatus, with which the permanent magnet apparatus can be warmed up to a predetermined working temperature in a short time.

According to the invention, there is provided a nuclear gyromagnetic resonance permanent magnet thermostatic system, which comprises a permanent magnet apparatus including a pair of magnetomotive force generating parts extending toward and facing each other and defining a magnetic gap to accommodate a sample to be analyzed and a magnetic yoke structure enclosing said magnetomotive force generating parts, a first temperature regulated thermostatic oven enclosing the permanent magnet apparatus, a preset temperature for the first thermostatic oven being higher than ambient temperature, a second temperature regulated thermostatic oven also enclosing the permanent magnet apparatus and interposed between the permanent magnet apparatus and the first thermostatic oven, a preset temperature for the second thermostatic oven being higher than the preset temperature for the first thermostatic oven, whereby the permanent magnet apparatus is maintained substantially at the same temperature as that of the second thermostatic oven.

Also, the nuclear gyromagnetic resonance permanent magnet apparatus thermostatic system according to the invention includes a thermal equalization structure interposed between the first and second thermostatic ovens.

Further, the nuclear gyromagnetic resonance permanent magnet apparatus thermostatic system according to the invention includes means to sense the temperature of the permanent magnet apparatus, means to sense the temperature of the second thermostatic oven, means to obtain the product of temperatures detected by both said temperature sensing means, and means to control the temperature of the second thermostatic oven such as to maintain the product substantially constant.

Still further, the nuclear gyromagnetic resonance permanent magnet apparatus thermostatic system according to the invention includes a quick heater for quickly heating the permanent magnet apparatus and means to deenergize the quick heater when the permanent magnet apparatus is warmed up to a preset working temperature higher than ambient temperature.

Yet further, in the nuclear gyromagnetic resonance permanent magnet apparatus thermostatic system according to the invention, at least either one of the first and second thermostatic ovens and the thermal equalization structure is made of a material of high magnetic permeability to provide for magnetic shield effect.

The above and other objects and features of the invention will become more apparent from the following description having reference to the accompanying drawings, in which.

Prior to describing embodiments of the invention, description will first be made on the previously mentioned prior-art example of the constant temperature means for the magnet apparatus with reference to FIG. 1.

Figure 1:
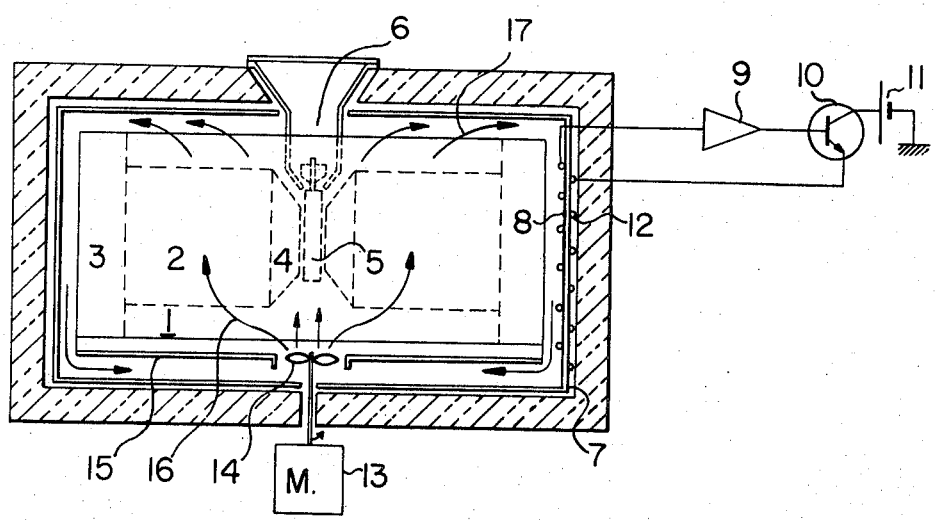
FIG. 1 is a sectional view of a prior-art example of the nuclear gyromagnetic resonance magnet apparatus thermostatic system.

Referring to FIG. 1, numeral 1 generally designates a double-E type (or commonly termed cyclotron type) magnet apparatus, which includes a yoke structure 3 enclosing a pair of Alnico anisotropic magnets 2 extending toward each other and provided at the facing ends with respective pole pieces 4. The magnets can produce a uniform magnetic flux with an intensity of about 14,000 Gauss sufficient to measure the nuclear gyromagnetic resonance in the gap between both pole pieces. Numeral 5 designates a resonance signal detecting means into which a sample probe 6 may be inserted. Enclosing the magnetic apparatus 1 is a hot insulated box 7 made of a metal plate having good thermal conductivity. Along the inner side of the hot insulated box 7 there are provided temperature sensor means connected to a temperature detection line 8. The output from the temperature detection line is amplified through an amplifier 9, whose output is used to on-off control a switching transistor 10 for automatically controlling current supply from a power supply 10 to heating elements 12 extending along the outer side of the thermally conductive hot insulated box 7. Through this automatic temperature control system the hot insulated box 7 can be held at a constant temperature. Further, for circulating air inside the hot insulated box a fan 14 driven from a motor 13 and a plate 15 promoting air flow are provided in the neighbourhood of the bottom of the yoke structure 3. With this means, the air within the box can circulate as shown by arrows 17. Circulating the air inside the box 7 in the above manner not only aide in rendering uniform the temperature of various parts of the magnet apparatus 1, but also through the circulating air the heat exchange between the hot insulated box 7 and the magnet apparatus 1 is obtained so that the whole magnet apparatus 1 can be held at substatially the same temperature as that of the hot insulated box 7.

The prior-art example of the above construction, however, has various drawbacks as mentioned earlier.

Figure 2:
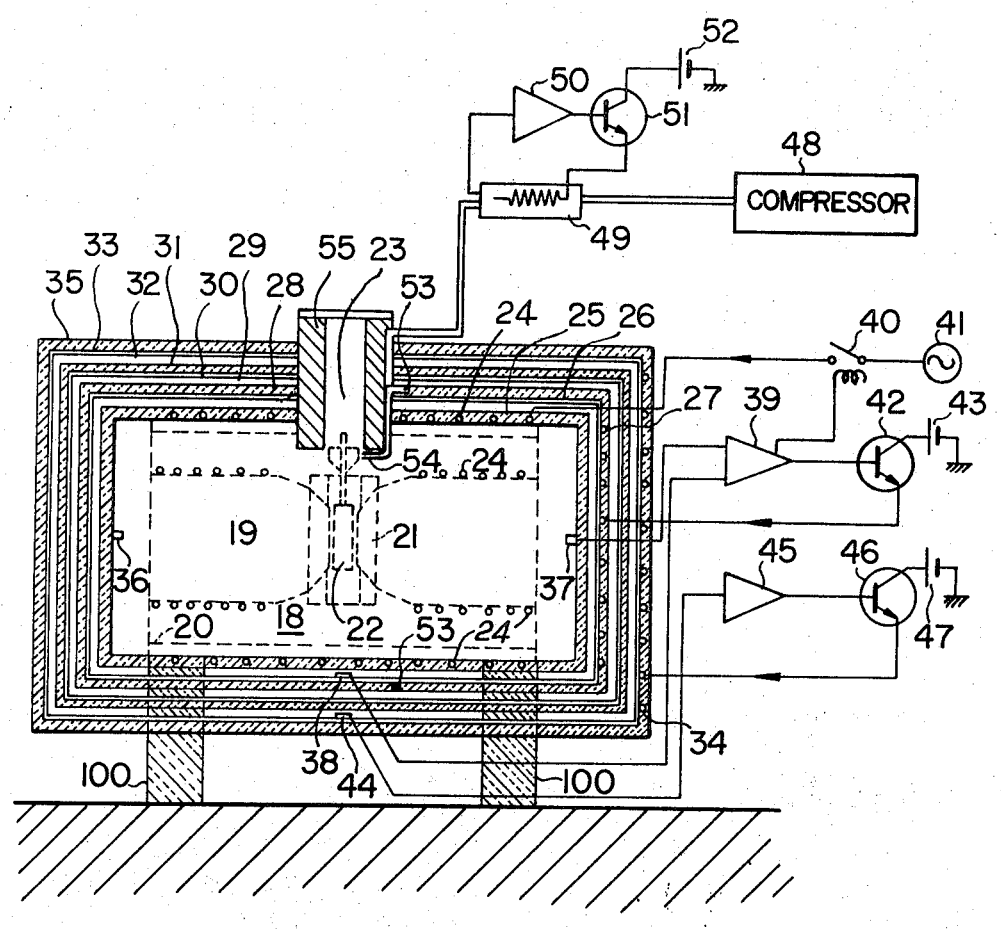
FIG. 2 is a sectional view of an embodiment of the nuclear gyromagnetic resonance permanent magnet apparatus thermostatic system according to the invention.

Referring now to FIG. 2, which show a thermostatic system embodying the invention, there is shown a permanent magnet apparatus 18 comprising a cylindrical yoke structure 20 enclosing the whole magnet such that the leakage magnetic flux is sufficiently small.

The magnet consists of two magnetomotive force generating parts 19 extending toward each other and provided at the facing ends with pole pieces 21, between which is interposed a resonance signal detecting means 22 into which a sample probe 23 containing a sample to be analyzed may be inserted. The magnetomotive force generating parts 19 and the yoke structure 20 are provided with quick heating means 24.

The magnet apparatus 18 is enclosed within an inner thermostatic oven 26. Numeral 25 designates a heat insulating material through which a portion of the quick heating means 24 passes and which serves to prevent direct transfer of heat from the quick heating means 24 to the inner thermostatic oven 26 and provides a predetermined time constant of lagging of heat transfer between the two. The heat insulating material layer 25 is spaced from the inner thermostatic oven 26 to provide an air layer. The inner thermostatic oven 26 is held at a predetermined temperature, for instance 35 ± 0.01°C. The outer surface of the inner thermostatic oven 26 is provided with heating elements 27 to provide heat energy uniformly over the entire outer surface. Numeral 28 designates a heat insulating material, numeral 30 a thermally equalizing structure provided between the inner thermostatic oven 26 and an outer thermostatic oven 33, and numeral 31 a heat insulating material. The heat insulating material 28 is spaced from the thermally equalizing material 30 to provide an air layer 29, and the heat insulating material 31 is spaced from the outer thermostatic oven 33 to provide an air layer 32. The outer thermostatic oven 33 is heated to a predetermined temperature, for instance 32 ± 0.1°C, which is well above ambient room temperature. Numeral 35 designates a heat insulating material surrounding the outer thermostatic oven 33. Numeral 100 designates supports supporting the whole thermostatic oven structure described above and made of a heat insulating material such as plastics and wood.

With the above thermostatic oven structure the magnetic apparatus enclosed therein may be held at a constant temperature, for instance 35 ± 0.01°C.

A temperature control system for controlling the magnetic temperature to a steady constant temperature will now be described.

Figure 4:
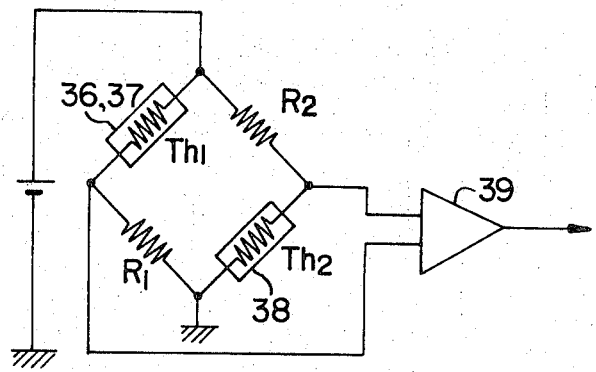
FIG. 4 is a circuit diagram showing a temperature detection circuit in the thermostatic system according to the invention.

Thermistors 36 and 37 for sensing the temperature of the magnet are provided centrally of opposite sides of the yoke structure 20, and another thermistor 38 for sensing the temperature of the inner thermostatic oven 26 is provided on the inner surface thereof. These thermistors are electrically connected the form a bridge as shown in FIG. 4. The bridge output is coupled to an amplifier 39, whose output is used to close relay contacts 40. When the relay 40 is activated, power from an a-c source 41 is supplied through the relay 40 to the quick heating means 24 provided to the magnetmotive force generating parts 19 and yoke structure 20 of the magnet apparatus 18 for heating the same. When a predetermined temperature (for instance 35 ± 0.01°C) of the magnet apparatus 18 is sensed by the thermistors 36 and 37, the relay 40 is deergized to cut power supply to the heater 24. Then, power from a power supply 43 is fed through a transistor switch 42 to the heater 27 provided on the outer surface of the inner thermostatic oven 26, whereby the temperature thereof is controlled to a predetermined temperature (35 ± 0.01°C). More particularly, the heater 27 for the inner thermostatic oven 26 is controlled such as to satisfy the balance condition $Th_1 \times Th_2 = R_1 \times R_2$ in the bridge shown in FIG. 4. In other words, the heater 27 is controlled such that the product of the temperature of the inner thermostatic oven 26 and the temperature of the magnetic apparatus 18 is always constant. A further thermistor 44 is provided for sensing the temperature of the outer thermostatic oven 33. The output of this thermistor is amplified by an amplifier 45, whose output is coupled to a transistor switch 46 for on-off controlling the transistor. According to the state of the transistor 46 current from a power supply 47 is supplied to the heater 34 provided on the outer surface of the outer thermostatic oven 33, thereby controlling the temperature of the outer thermostatic oven 33 to a predetermined temperature (for instance 32 ± 0.1°C).

During the resonance signal measurement, the sample probe 23 inserted in the resonance signal detecting means 22 is rotated at a high speed by using blowing compressed air in order to prevent broadening of the resonance line due to non-uniform field. The compressed air is provided from an air compressor 48, and its temperature is elevated to be nearly equal to the temperature of the magnet apparatus 18 through a heat exchanger 49 and then more closely to the magnet temperature as it passes through a pipe 53 extending round the inner thermostat oven 26 in close thermal contact with its outer surface, before it is blown through a nozzle to a turbine to rotate the same with the sample probe 23. An amplifier 50, a transistor switch 51 and a heating power supply 52 are provided for the heat exchanger 49.

Figure 3:
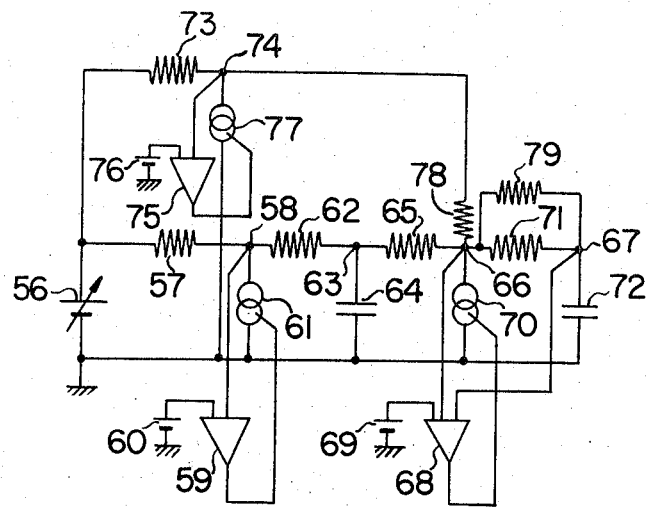
FIG. 3 shows an electrical equivalent circuit for the thermostatic system according to the invention.

FIG. 3 shows an electrical equivalent circuit for the thermostatic system described above. In the equivalent circuit, voltage is equivalent to temperature, current is equivalent to heat, resistance is equivalent to thermal insulation, and capacitance is equivalent to heat capacity. Thus, in FIG. 3 numeral 56 represents varying temperature of external atmosphere, numeral 57 thermal resistance between external atmosphere and outer thermostatic oven, numeral 58 temperature of the outer thermostatic oven, numeral 59 temperature control amplifier, numeral 60 preset temperature for the outer thermostatic oven, numeral 61 outer thermostatic oven heater (indicated as a constant current source), numeral 62 thermal resistance between outer thermostatic oven and intermediate thermally equalizing structure, numeral 63 temperature of the thermally equalizing structure, numeral 64 heat capacity of the thermally equalizing structure, 65 thermal resistance between thermally equalizing structure and inner thermostatic oven, numeral 66 temperature of the inner thermostatic oven, numeral 67 temperature of the magnet, numeral 68 temperature control amplifier, numeral 69 preset temperature for the inner thermostatic oven, numeral 70 inner thermostatic oven heater, numeral 71 thermal resistance between inner thermostatic oven and magnet, numeral 72 heat capacity of the magnet, numeral 73 thermal resistance of the heat exchanger, numeral 74 temperature of the output air from the heat exchanger, numeral 75 temperature control amplifier, numeral 76 preset air temperature, numeral 77 heat exchange heater, numeral 78 thermal resistance of the heat exchanger provided to the inner thermostatic oven, and numeral 79 thermal resistance of the air from the nozzle for rotating the sample probe.

The operation of the thermostatic system shown in FIG. 2 will now be described with reference to FIG. 3. The heat corresponding to ambient temperature (room temperature) 56 is subjected to the thermal lagging through the thermal resistance 57 between the external atmosphere and the outer thermostatic oven 33 before reaching the outer thermostatic over 33. The temperature 58 of the outer thermostatic oven 33 is sensed by the thermistor 44, whose output is amplified by the amplifier 59 (or 45 in FIG. 2). The heater 61 (or 34 in FIG. 2) is controlled according to the output of the amplifier 59 such that the temperature 58 of the outer thermostatic oven 33 is held at the same temperature as the preset temperature 60. The heat corresponding to the temperature 58 of the outer thermostatic oven 33 is subjected to thermal lagging and equalization through the thermal resistance 62 between the outer thermostatic oven 33 and thermally equalizing structure 30 before reaching the thermally equalizing structure 30. Also, the thermally equalizing structure having the heat capacity 64 provides thermal equalization. The heat corresponding to the temperature 63 of the thermally equalizing structure 30 is subjected to thermal lagging and equalization through the thermal resistance 65 between the thermally equalizing structure 30 and inner thermostatic oven 26 before reaching the inner thermostatic oven 26. The thermal resistance 71 between the inner thermostatic oven 26 and the magnet and the heat capacity 72 of the magnet provide a large time constant of thermal equalization of the magnet temperature 67 due to heat corresponding to the temperature 66 of the inner thermostatic oven 26 transmitted to the magnet. The magnet temperature 67 is sensed by the thermistors 36 and 37, and the temperature 66 of the inner thermostatic oven 26 is sensed by the thermistor 38. The outputs of these thermistors are amplified by the amplifier 68 (or 39 in FIG. 2). The heater 70 (or 27 in FIG. 2) is controlled according to the output of the amplifier 68 such that the temperature 66 of the inner thermostatic oven 26 becomes equal to the preset temperature 69.

Meanwhile, the atmospheric air at the temperature 56 is compressed by the air compressor 48 as mentioned earlier, and the compressed air is introduced into the heat exchanger 49 having the thermal resistance 73. The temperature of the heat exchanger 49 is detected, and the detection output is amplified by the amplifier 75 (or 50 in FIG. 2). The temperature of the heat exchanger 49 is controlled according to the output of the amplifier 75 such that the air from the heat exchange 49 is held substantially at the same temperature as the magnet temperature. As the air from the heat exchanger 49 having the temperature 74 passes through the compressed air pipe 53 wound on the outer surface of the inner thermostatic oven 26 and having the resistance 78, its temperature is further rendered close to the magnet temperature when it is blown out of the nozzle 54 to the turbine for rotating the sample probe.

In the embodiment described above, it has been found that by controlling the temperature of the outer thermostatic oven to $32 \pm 0.1°C$, the temperature of the inner thermostatic oven to $35 \pm 0.01°C$ and the temperature of the heat exchanger 49 to $35 \pm 0.1°C$ it is possible to readily maintain the magnet temperature at $35 \pm 0.001°C$ even in case if the ambient temperature varies in a range between 16° and 30°C.

Figure 5:
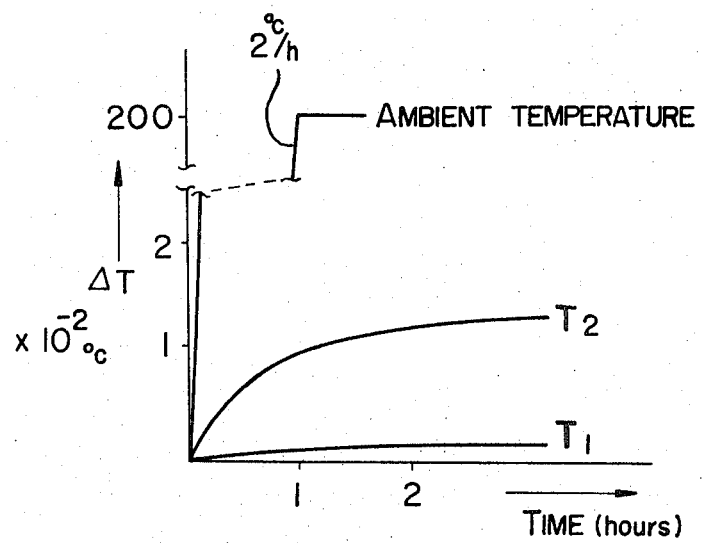
FIG. 5 is a graph showing plots of magnet temperature response to a change in ambient temperature (room temperature) obtained with the thermostatic system according to the invention and a prior-art thermostatic system.

FIG. 5 shows the magnet temperature response to a change in ambient temperature (room temperature) obtained with the thermostatic system according to the invention and a prior-art thermostatic system.

More particularly, it compares the magnet temperature change obtained with the system according to the invention (the lower curve $T_1$) and that obtained with the prior-art system (the upper curve $T_2$) when the ambient temperature (room temperature) is changed at a rate of 2°C per hour. It will be seen that the rate of change of the magnet temperature corresponding to changes in the ambient temperature is extremely small with the system according to the invention compared to the prior-art system.

The advantages of the embodiment described above will be summarized as follows.

1. By presetting the temperature of the outer thermostatic oven to a temperature higher than the external temperature and the temperature of the inner thermostatic oven to be higher than the preset temperature of the outer thermostatic oven, it is possible to eliminate the effects of external temperature upon the magnet, obtain temperature control without using cooling means, and improve the temperature stability of the whole system without the need of excessively increasing the loop gain of the thermostatic control system to such an extent as to make the design of the system difficult.

2. By providing a thermally conductive structure for thermal equalization between the inner and outer thermostatic ovens it is possible to render uniform (equalize) the magnet temperature distribution, and since it is not necessary to obtain an average temperature by cancelling out temperatures at various points of the magnet but it is only necessary to detect the temperature of a portion of the magnet, the circuit design for the temperature control circuit may be simplified.

3. The effectiveness of the thermal equalization can be enhanced through utilization of the heat insulation layers and air layers.

4. High precision temperature control is possible through the control of the inner thermostatic oven temperature such as to render constant the product of the inner thermostatic oven temperature and the magnet temperature.

5. The magnetic shield effects may be obtained by using a material of high magnetic permeability for at least either one of the inner and outer thermostatic ovens. For example, by forming the outer thermostatic oven and the thermally equalizing structure from permalloy plate having a thickness of about 1 to 2 mm and the inner thermostatic oven from iron plate, a shield effect of one for several tens could be obtained with respect to external disturbing field. At this time, a leakage flux present in the magnet would result in a reaction change in the field intensity due to the change in permeability of the shield material with the change in temperature. Thus, the fact that the thermostatic oven also serves as a magnetic shield is extremely effective in providing for a constant temperature.

6. With the quick heating means for quickly elevating the magnet temperature up to the actual working temperature reduction of the warming-up time may be obtained.

7. The temperature of the compressed air for rotating the sample probe may be elevated to be substantially equal to the magnet temperature by passing it through the heat exchange and then more closely to the magnet temperature by subsequently passing it through the heat exchanger pipe provided round the inner thermostatic oven.

Since many changes and modifications may be made in the above construction of the thermostatic system for permanent magnet apparatus for nuclear gyromagnetic resonance spectroscopy without departing from the scope of the invention, it is intended that all matters which are contained in the above description or shown in the accompanying drawings shall be interpreted as illustrative for facilitating the understanding of the gist of the invention and not in a limitative sense. For example, while the foregoing description is concerned with a thermostatic oven structure consisting of two, temperature controllable thermostatic ovens, more than two thermostatic ovens may be incorporated if desired.

What we claim is:

1. A thermostatic system for nuclear gyromagnetic resonance permanent magnet apparatus comprising a permanent magnet apparatus including a pair of magnetomotive force generating parts extending toward and facing each other and defining a magnetic gap to accommodate a sample to be analyzed and a magnetic yoke structure enclosing said magnetomotive force generating parts, a first temperature regulated thermostatic oven enclosing said permanent magnet apparatus, a preset temperature for said first thermostatic oven being higher than ambient temperature, a second temperature regulated thermostatic oven also enclosing said permanent magnet apparatus and interposed between said permanent magnet apparatus and said first thermostatic oven, a preset temperature for said second thermostatic oven being higher than the preset temperature for said first thermostatic oven, first means to sense the temperature of said permanent magnet apparatus, second means to sense the temperature of said second thermostatic oven, means to obtain the product of temperatures detected by both said first and second temperature sensing means, and means to control the temperature of said second thermostatic oven to maintain said product of temperatures substantially constant,.

2. The thermostatic system according to claim 1, which further comprises a thermally conductive structure for thermal equalization, said structure being interposed between said first thermostatic oven and said second thermostatic oven.

3. The thermostatic system according to claim 2, wherein at least either one of said first and second thermostatic ovens and said thermal equalization structure is made of a material of high magnetic permeability.

4. The thermostatic system according to claim 1, which further comprises means to rotate said sample within said magnetic gap by using compressed air and means to heat said compressed air to a temperature substantially equal to the temperature of said second thermostatic oven.

5. The thermostatic system according to claim 1, which further comprises a thermally insulative structure disposed on the outer side of and enclosing said first thermostatic oven and another thermally insulative structure disposed on the outer side of and enclosing said second thermostatic oven.

6. The thermostatic system according to claim 2, which further comprises a thermally insulative structure disposed on the outer side of and enclosing said first thermostatic oven and another thermally insulative structure interposed between said second thermostatic oven and said thermal equalization structure and enclosing said second thermostatic oven.

7. The thermostatic system according to claim 1, which further comprises a quick heating means for quickly heating said permanent magnet apparatus and means to de-energize said quick heating means when the temperature of said magnet apparatus is elevated to be substantially equal to the preset temperature for said second thermostatic oven.

8. The thermostatic system according to claim 1, wherein at least either one of said first and second thermostatic ovens and said thermal equalization structure is made of a material of high magnetic permeability.

9. The thermostatic system according to claim 8, which further comprises a thermally insulative structure disposed on the outer side of and enclosing said first thermostatic oven and another thermally insulative structure disposed on the outer side of and enclosing said second thermostatic oven.

10. The thermostatic system according to claim 3, which further comprises a thermally insulative structure disposed on the outer side of and enclosing said first thermostatic oven and another thermally insulative structure interposed between said second thermostatic oven and said thermal equalization structure and enclosing said second thermostatic oven.

11. The thermostatic system according to claim 2, which further comprises a quick heating means for quickly heating said permanent magnet apparatus and means to de-energize said quick heating means when the temperature of said magnet apparatus is elevated to be substantially equal to the preset temperature for said second thermostatic oven.

12. The thermostatic system according to claim 3, which further comprises a quick heating means for quickly heating said permanent magnet apparatus and means to de-energize said quick heating means when the temperature of said magnet apparatus is elevated to be substantially equal to the preset temperature for said second thermostatic oven.

13. The thermostatic system according to claim 5, which further comprises a quick heating means for quickly heating said permanent magnet apparatus and means to de-energize said quick heating means when the temperature of said magnet apparatus is elevated to be substantially equal to the preset temperature for said second thermostatic oven.

14. The thermostatic system according to claim 6, which further comprises a quick heating means for quickly heating said permanent magnet apparatus and means to de-energize said quick heating means when the temperature of said magnet apparatus is elevated to be substantially equal to the preset temperature for said second thermostatic oven.

15. The thermostatic system according to claim 2, which further comprises a pipe extending round said second thermostatic oven.

16. The thermostatic system according to claim 4, which further comprises a pipe extending round said second thermostatic oven.

17. The thermostatic system according to claim 5, which further comprises a pipe extending round said second thermostatic oven.

18. The thermostatic system according to claim 7, which further comprises a pipe extending round said second thermostatic oven.

19. The thermostatic system according to claim 8, which further comprises a pipe extending round said second thermostatic oven.

20. A thermostatic system for nuclear gyromagnetic resonance permanent magnet apparatus comprising a permanent magnet apparatus including a pair of magnetomotive force generating parts extending toward and facing each other and defining a magnetic gap to accommodate a sample to be analyzed and a magnetic yoke structure enclosing said magnetomotive force generating parts, a first temperature regulated thermostatic oven enclosing said permanent magnet apparatus, a preset temperature for said first thermostatic oven being higher than ambient temperature, a second temperature regulated thermostatic oven also enclosing said permanent magnet apparatus and interposed between said permanent magnet apparatus and said first thermostatic oven, a preset temperature for said second thermostatic oven being higher than the preset temperature for said first thermostatic oven, and means to rotate said sample within said magnetic gap including a source of compressed air and a pipe extending around said second thermostatic oven having one end connected to said source of compressed air and the other end disposed adjacent said sample.

21. The thermostatic system according to claim 20, which further comprises a thermally conductive structure for thermal equalization, said structure being interposed between said first thermostatic oven and said second thermostatic oven.

22. The thermostatic system according to claim 20, which further comprises means to sense the temperature of said permanent magnet apparatus, means to sense the temperature of said second thermostatic oven, means to obtain the product of temperatures detected by both said temperature sensing means, and means to control the temperature of said second thermostatic oven such as to maintain said product substantially constant.

23. The thermostatic system according to claim 21, wherein at least either one of said first and second thermostatic ovens and said thermal equalization structure is made of a material of high magnetic permeability.

24. The thermostatic system according to claim 20, in which said means to rotate said sample further comprises means to pre-heat said compressed air to a temperature substantially equal to the temperature of said second thermostatic oven.

25. The thermostatic system according to claim 20, which further comprises a thermally insulative structure disposed on the outer side of and enclosing said first thermostatic oven and another thermally insulative structure disposed on the outer side of and enclosing said second thermostatic oven.

26. The thermostatic system according to claim 21, which further comprises a thermally insulative structure disposed on the outer side of and enclosing said first thermostatic oven and another thermally insulative structure interposed between said second thermostatic oven and said thermal equalization structure and enclosing said second thermostatic oven.

27. The thermostatic system according to claim 20, which further comprises a quick heating means for quickly heating said permanent magnet apparatus and means to de-energize said quick heating means when the temperature of said magnet apparatus is elevated to be substantially equal to the preset temperature for said second thermostatic oven.

* * * * *